United States Patent Office 3,560,455
Patented Feb. 2, 1971

3,560,455
PROCESS OF FORMING COPOLYMERS OF MALEIC ANHYDRIDE AND AN ALIPHATIC OLEFIN HAVING FROM 20 TO 30 CARBON ATOMS
Stanley M. Hazen, Cheswick, and William J. Heilman, Allison Park, Pa., assignors to Gulf Research & Development Company, Pittsburgh, Pa.
No Drawing. Filed May 26, 1969, Ser. No. 827,920
Int. Cl. C08f 1/08
U.S. Cl. 260—78.5           8 Claims

ABSTRACT OF THE DISCLOSURE

Maleic anhydride and an aliphatic olefin having from 20 to 30 carbon atoms, such as a mixture of alpha-olefins having from 20 to 30 carbon atoms, are copolymerized in the presence of a free-radical catalyst and a solvent such as a saturated dihalogenated aliphatic liquid hydrocarbon having from one to five carbon atoms, for example propylene dichloride. Enough solvent is employed to solubilize not only the reactants but also the copolymer products. The copolymer is precipitated in a filterable particulate solid form substantially free of monomers by cooling the entire reaction product to a temperature from about 35° C. to about 55° C. and admixing the cooled reaction product with an aliphatic monohydroxy alcohol having three carbon atoms per molecule, such as n-propanol, while maintaining the desired cool temperature.

This invention relates to the preparation of a copolymer of maleic anhydride and an aliphatic olefin having from 20 to 30 carbon atoms per molecule in a particulate solid form.

The preparation of copolymers of maleic anhydride and various unsaturated monomers, especially ethylene and styrene, is well known in the art. Many of the prior art processes relating to the preparation of maleic anhydride copolymers teach the use of solvents for the reaction which dissolve the maleic anhydride and ethylene, but which are non-solvents for the resulting copolymer so that the copolymer precipitates as a solid during the reaction and is capable of being separated from the reaction mixture by filtration or otherwise. It has been found, however, that in the preparation of a copolymer of maleic anhydride and an aliphatic olefin having 20 to 30 carbon atoms per molecule, the resulting copolymers are very difficult to obtain in a particulate solid readily filterable form.

It has now been found in accordance with the invention that a copolymer of maleic anhydride and an aliphatic olefin having from 20 to 30 carbon atoms per molecule can be prepared by a process which comprises: copolymerizing maleic anhydride and at least one of said olefins in the presence of a free-radical catalyst and a solvent for the maleic anhydride, said aliphatic olefin and the resulting copolymer; cooling said copolymer solution to a temperature from about 35° C. to about 55° C.; and while maintaining said temperature admixing said copolymer product while in solution with a monohydoxy aliphatic alcohol having three carbon atoms per molecule, the amount of said alcohol being sufficient and the rate of addition of said copolymer solution being such as to result in the precipitation of the copolymer in a particulate solid form.

The olefinic reactant can be a single olefin or preferably a mixture of two or more olefins having from 20 to 30 carbon atoms per molecule. The preferred olefins are the aliphatic alpha-olefins having from 22 to 28 carbon atoms per molecule. The double bond in the olefinic reactant can be in the beta position, although such olefins are more difficult to copolymerize. The olefins can be obtained from any suitable source, such as the cracking of wax or other paraffinic-type hydrocarbons, or by the so-called telomerization process wherein a small olefin, such as ethylene, is reacted in the presence of a metal alkyl, such as aluminum triethyl, to produce higher carbon number olefins or mixtures of higher carbon number olefins. The telomerization process is normally run in a continuous manner, such as in a coil reactor, as described more fully in Ser. No. 608,127 to Fernald et al., filed in the United States Patent Office on Jan. 9, 1967, now issued as U.S. Pat. No. 3,482,000, the disclosure of which is incorporated herein by reference. Only even numbered olefinic products, predominantly alpha-olefins are produced; for example, the $C_{20}$ through $C_{30}$ alpha-olefins useful in the process of this invention can be produced. Typically, a $C_{22}$ to $C_{28}$ olefinic fraction is distilled over (with small amounts of $C_{20}$ and $C_{30}$ olefins) as a reaction product from the telomerization process. This $C_{22}$ to $C_{28}$ fraction normally contains higher amounts of the $C_{22}$ to $C_{26}$ olefins so that the average carbon number of the mixture is about $C_{24}$. It has been found that this mixture of aliphatic alpha-olefins from the telomerization process is ideally suited for use in the process of this invention.

Examples of suitable olefins include, but are not limited to:
1-eicosene;
1-docosene;
2-tetracosene;
4-ethyl-2-tetracosene;
1-octacosene;
2-docosene;
3-methyl-1-henicosene;
3-ethyl-1-docosene;
1-tetracosene;
1-hexacosene;
2-hexacosene;
3,3-dimethylhexacosene;
2-octacosene;
3-methyl-3-ethyl-1-pentacosene;
1-tricosene;
1-pentacosene;
or mixtures thereof.

Maleic anhydride is the other reactant used to prepare the desired copolymers by the process of this invention. It is preferred that the maleic anhydride be substantially free of maleic acid. The maleic anhydride will, of course, react with water to form the undesired maleic acid. Commercial maleic anhydride is suitable for use in the process of this invention, but in the event it is exposed to water and thereby becomes contaminated with maleic acid, means should be employed to remove the maleic acid before the maleic anhydride is used in the subject process. One suitable method of purifying the maleic anhydride is to dissolve the maleic anhydride in a liquid, such as benzene, which is a solvent for the maleic anhydride but a non-solvent for the maleic acid. The acid can then be separated by filtration or otherwise and the maleic anhydride recovered by evaporation of the benzene.

The unreacted maleic anhydride is usually the more difficult monomer to remove from the polymer, and therefore it is desirable to react essentially all of the maleic anhydride. Both the rate at which the maleic anhydride reacts and the total conversion of maleic anhydride can be increased by increasing the olefinic reactant concentration relative to the maleic anhydride. The molar ratio of olefin to maleic anhydride can vary between 0.1:1 and 100:1 with preferred molar ratios between 1:1 and 4:1. Due to the greater reactivity of the vinylidene type olefins, a slightly lower molar ratio can be employed.

The polymerization reaction is a solution-type polymerization wherein the maleic anhydride and olefin monomers are dissolved in a common solvent. The copolymerization can be initiated by any free-radical producing material well known in the art. The preferred free-radical initiators are the peroxide-type polymerization initiators and the azo-type polymerization initiators. Benzoyl peroxide is the most preferred initiator. Radiation can also be used to initiate the reaction, if desired.

The peroxide-type free-radical initiator can be organic or inorganic, the organic peroxides having the general formula:

$$R_7OOR_8$$

where $R_7$ is any organic radical and $R_8$ is selected from the group consisting of hydrogen and any organic radical. Both $R_7$ and $R_8$ can be organic radicals, preferably hydrocarbon, aroyl, and acyl radicals, carrying, if desired, substituents such as halogens, etc. The most preferred peroxides are diaroyl and diacyl peroxides.

Examples of suitable peroxides, which in no way are limiting, include benzoyl peroxide; lauroyl peroxide; tertiary butyl peroxides; 2,4-dichlorobenzoyl peroxide; tertiary butyl hydroperoxide; cumene hydroperoxide; diacetyl peroxide; acetyl hydroperoxide; diethylperoxycarbonate; tertiary butyl perbenzoate; and the various compounds, such as the perborates.

The azo-type compounds, typified by alpha,alpha'-azobisisobutyronitrile, are also well-known free-radical promoting materials. These azo compounds can be defined as those having present in the molecule group —N=N—, wherein the valences are satisfied by organic radicals, at least one of which is preferably attached to a tertiary carbon. Other suitable azo compounds include, but are not limited to, p-bromobenzenediazonium fluoborate; p-tolyldiazoaminobenzene; p-bromobenzenediazonium hydroxide; azomethane and the phenyldiazonium halides. A suitable list of azo-type compounds can be found in U.S. Pat. No. 2,551,813, issued May 8, 1951 to Paul Pinkney.

The amount of initiator to employ, exclusive of radiation, of course, depends to a large extent on the particular initiator chosen, the olefinic charge stock and the reaction conditions. The initiator must, of course, be soluble in the reaction medium. The usual concentrations of intiator are between 0.001:1 and 0.1:1 moles of initiator per mole of maleic anhydride, with preferred amounts between 0.005:1 and 0.03:1. In general, the more reactive olefins, such as the vinylidene-type, require smaller amounts of the initiator.

The polymerization temperature must be sufficiently high to break down the initiator to produce the desired free-radicals. For example, using benzoyl peroxide as the initiator, the reaction temperature can be between 75° C. and 90° C., preferably between 80° C. and 85° C. Higher and lower temperatures can be employed, a suitable broad range of temperatures being between 20° C. and 200° C., with preferred temperatures between 50° C. and 120° C.

The reaction pressure can be atmospheric or below, but super-atmospheric pressures of up to 1,000 p.s.i.g. or higher can be used. It is preferred to maintain the olefinic reactants in the liquid phase for better contacting. The preferred pressure is, of course, atmospheric pressure.

The reaction time is usually sufficient to result in the substantially complete conversion of the maleic anhydride monomer to copolymer. The reaction time is suitably between 1 and 24 hours, with preferred reaction times between 2 and 10 hours.

The copolymers of this invention generally have inherent viscosities of between 0.05 and 1.5 deciliters per gram. This is measured by dissolving five grams of copolymer in one deciliter of acetone and measuring the inherent viscosities at 25° C. This inherent viscosity is indicative of molecular weight. Copolymers having higher or lower molecular weights, i.e. higher or lower viscosities, can be prepared.

As noted above, the subject reaction is a solution-type polymerization reaction. The olefin, maleic anhydride, solvent and initiator can be brought together in any suitable manner. The important factors are intimate contact of the olefin and maleic anhydride in the presence of a free-radical producing material. The reaction, for example, can be conducted in a batch system where the olefin is added all initially to a mixture of maleic anhydride, initiator and solvent or the olefin can be added intermittently or continuously to the reaction pot. In another manner, the components in the reaction mixture can be added continuously to a stirred reactor with continuous removal of a portion of the product to a recovery train or to other reactors in series. The reaction can also suitably take place in a coil-type reactor where the components are added at one or more points along the coil.

The reaction solvent, as noted above, must be one which dissolves both the maleic anhydride and the olefinic monomer. It is necessary to dissolve the maleic anhydride and olefinic monomer, so as to bring them into intimate contact in the solution polymerization reaction. It has been found that the solvent must also be one in which the resulting copolymers are soluble, but not so soluble that the copolymers cannot be precipitated out of solution by the addition of the solution to a monohydroxy alcohol having three carbon atoms.

Suitable solvents include liquid saturated or aromatic hydrocarbons having from 6 to 20 carbon atoms, ketones having from 3 to 5 carbon atoms, and liquid saturated aliphatic dihalogenated hydrocarbons having from 1 to 5 carbon atoms per molecule, preferably from 1 to 3 carbon atoms per molecule. By "liquid" is meant liquid under the conditions of polymerization. In the dihalogenated hydrocarbons, the halogens are preferably on adjacent carbon atoms. By "halogen" is meant F, Cl and Br. The amount of solvent must be such that it can dissolve the maleic anhydride and olefin monomers in addition to the resulting copolymers. The volume ratio of solvent to olefinic monomer is suitably between 1:1 and 100:1 and is preferably between 1.5:1 and 4:1.

The preferred solvents are the saturated hydrocarbons having from 6 to 10 carbon atoms and the saturated dichlorinated hydrocarbons having from 1 to 5, more preferably 1 to 3, carbon atoms.

Examples of suitable solvents include, but are not limited to:

(1) saturated hydrocarbons, such as:
  pentane;
  hexane;
  heptane;
  octane; and
  isooctane (2) aromatic hydrocarbons, such as:
  benzene;
  xylenes; and
  toluene (3) saturated dihalogenated hydrocarbons, such as:
  dichloromethane;
  dibromomethane;
  1-bromo-2-chloro-ethane;
  1,1-dibromomethane;
  1,1-dichloroethane;
  1,2-dichloroethane;
  1,3-dibromopropane;
  1,2-dibromopropane;
  1,2-dibromo-2-methylpropane;
  1,2-dichloropropane;
  1,1-dichloropropane;
  1,3-dichloropropane;
  1-bromo-2-chloropropane;
  1,2-dichlorobutane;
  1,5-dibromopentane; and
  1,5-dichloropentane (4) ketones, such as:
  acetone; and
  methyl ethyl ketone.

The reaction mixture comprising the copolymer, any unreacted monomers and the solvent is then cooled to a temperature from about 35° C. to about 55° C. The cooled reaction mixture is then added to a liquid monohydroxy aliphatic alcohol having three carbon atoms per molecule while maintaining said temperature at a rate such that the copolymer precipitates in a finely divided particulate filterable solid form.

It is critical for the purposes of this invention that the temperature of the reaction mixture being added to the monohydroxy alcohol be maintained from about 35° C. to about 55° C. By operating in this manner the monomers are dissolved in the monohydroxy alcohol but the desired copolymers are precipitated in a finely divided filterable solid form. If the temperature during the precipitation step is permitted to exceed about 55° C., the desired copolymers become sticky and tend to agglomerate into an unwieldy solid mass. If the temperature during the precipitation step is permitted to fall below about 35° C., both the unreacted monomers and the desired copolymers tend to precipitate and thus create additional problems of separation. Thus, if the temperature during the precipitation step is maintained from about 35° C. to about 55° C., the desired copolymers will precipitate in the desired manner while the unreacted monomers will conveniently dissolve in the n-propanol or isopropanol. Most preferably, the temperature during the precipitation step is maintained from about 40° C. to 50° C.

It is preferable to remove any excess solvent before adding the reaction mixture to the alcohol since increased amounts of solvent merely require the use of increased amounts of alcohol to result in the precipitation of the copolymers. Usually the weight ratio of alcohol to solvent exceeds about 1:1 and is preferably in excess of 2:1. Preferably, a weight ratio of alcohol to solvent of about 4:1 is used, although ratios of 10:1 to 100:1 or more can be employed if desired. Of course the initial weight ratio of alcohol to solvent may be very, very high if a batch precipitation is used wherein the solvent mixture is added to a large volume of alcohol. A continuous precipitation system can also be employed where a stream of alcohol and a stream of solvent reaction product are simultaneously admitted to a precipitation hold tank in the proper ratios and product is continuously removed.

It has been found that alcohols such as methanol, ethanol and butanol are unsuitable for the precipitation of the maleic anhydride-$C_{20}$–$C_{30}$ olefin copolymers of this invention. The only alcohols which are suitable are the monohydroxy aliphatic alcohols having three carbon atoms per molecule, i.e. n-propanol and isopropanol.

The manner of admixing the reaction mixture with the nonsolvent alcohol is not critical. The usual procedure is to admix the total reaction mixture from the telomerization reactor after appropriate cooling, as noted above, and including the solvent copolymer, any unreacted monomers and initiator with the non-solvent by pouring at such a rate that the copolymer forms a fine particulate solid suitable for separating by filtration or centrifugation. If the opposite procedure is employed, namely, if the non-solvent is added to the total reaction mixture even at the appropriate temperature, the copolymer will tend to precipitate in larger size pieces, which are not desirable, but such a procedure of addition can be employed with proper stirring. The non-solvent is preferably stirred well during the addition of the total reaction mixture.

After the addition of the total reaction mixture to the non-solvent and the precipitation of the particulate solid copolymer, the copolymer is separated from the other components by any suitable means, such as by filtration or centrifugation. By following the process of this invention and using the defined solvent-non-solvent combination, the copolymers are obtained in an easily filterable particulate solid form which has many advantages from the standpoint of ease of drying and handling. After separation of the copolymer solids, the remaining components can be separated by fractionation to recover the solvent, non-solvent and unreacted monomers for recycle. It is, therefore, also preferred to employ a particular solvent-non-solvent combination which is easy to separate by distillation.

The copolymer can be washed with any suitable liquid which can dissolve and thus remove any unreacted monomers. The solvent used in the reaction is suitable. The wash liquid is preferably heated to aid in the washing procedure. While the copolymer may be soluble in the wash liquid, the rate of solution of the copolymer is so much slower than the rate of solution of the monomers that very little of the copolymer is dissolved in the wash liquid. The copolymer can then be dried by any conventional drying procedure to remove any residual solvent and/or washing liquids.

The copolymer products are essentially a chain of alternate groupings of maleic anhydride and the olefinic monomer reactants, this being true even though much higher or lower ratios of olefin to maleic anhydride than 1:1 were employed. The copolymers are useful for many purposes, including their use as dispersants for pigments, or as intermediates in the preparation of polyesters by their reaction with polyols or polyepoxides.

The invention will be further described with reference to the following specific examples.

A mixture of predominantly aliphatic alpha-olefins having from 22 to 28 carbon atoms per molecule was prepared by the telomerization of ethylene. An analysis of the olefinc mixture is given in Table I below.

TABLE I

| Olefin Carbon No.: | Percent by wt. in the mixture |
|---|---|
| $C_{20}$ | 0.1 |
| $C_{22}$ | 34.7 |
| $C_{24}$ | 30.6 |
| $C_{26}$ | 19.1 |
| $C_{28}$ | 17.3 |
| $C_{30}$ | 8.2 |

A copolymer of maleic anhydride and the above-described mixture of olefins was prepared by adding 370.3 grams (1.1 moles) of the mixture of olefins to a reaction mixture consisting of 200 grams (1.8 moles) of propylene dichloride (1,2-dichloropropane), 58.8 grams (0.6 mole) of maleic anhydride, and 1.5 grams (0.006 mole) of benzoyl peroxide as the initiator. The addition was made at room temperature and the reaction temperature was increased to between 119° C. and 121° C. (reflux) at a pressure of atomspheric for a reaction time of 4 hours.

The reaction product was a solution of the maleic anhydride-$C_{22}$–$C_{28}$ olefin copolymer and some unreacted monomers in propylene dichloride. This reaction product was then treated as shown in the following examples.

EXAMPLE 1

25 grams of the reaction product was poured slowly at a temperature of about 45° C. into 100 grams of n-propanol maintained at 45° C. and a finely divided filterable white solid was formed which was easily separated by simple filtration.

EXAMPLE 2

Example 1 is repeated except isopropanol is employed. Substantially the same results are obtained.

EXAMPLE 3

Example 1 was repeated except the temperature was increased to 60° C. No precipitate was formed.

EXAMPLE 4

Example 1 was repeated except the temperature during precipitation was 25° C. and both the unreacted monomers and copolymer precipitated.

EXAMPLE 5

Example 1 was repeated except ethanol was used as the precipitating alcohol and both the unreacted monomer and the copolymer precipitated.

EXAMPLE 6

Example 1 was repeated except n-butanol was employed as the precipitating alcohol but no precipitate was obtained.

EXAMPLE 7

Example 1 was repeated except n-pentanol was employed as the precipitating alcohol but no precipitate was obtained.

EXAMPLE 8

Example 1 was repeated except n-hexanol was employed as the precipitating alcohol and no precipitate was obtained.

Resort may be had to such variations and modifications as fall within the spirit of the invention and the scope of the appended claims.

We claim:

1. A process for the preparation of a copolymer of maleic anhydride and an aliphatic olefin having from 20 to 30 carbon atoms per molecule in a particulate solid form which comprises:
   copolymerizing maleic anhydride and at least one of said olefins in the presence of a free-radical catalyst and a solvent for the maleic anhydride, said aliphatic olefin and the resulting copolymer;
   cooling said copolymer solution to a temperature from about 35° C. to about 55° C.; and
   while maintaining said temperature admixing said copolymer product while in solution with a monohydroxy aliphatic alcohol having three carbon atoms per molecule, the amount of said alcohol being sufficient and the rate of addition of said copolymer solution being such as to result in the precipitation of the copolymer in a particulate solid form.

2. A process according to claim 1 wherein said copolymer product is cooled to a temperature from about 40° C. to about 50° C.

3. A process according to claim 1 wherein the aliphatic olefin is a mixture of olefins having predominantly from 22 to 28 carbon atoms.

4. A process according to claim 3 wherein the average number of carbon atoms in the aliphatic olefin mixture is 24.

5. A process according to claim 1 wherein the solvent is a dihalogenated aliphatic liquid hydrocarbon having from 1 to 5 carbon atoms.

6. A process according to claim 5 wherein the solvent has from 1 to 3 carbon atoms.

7. A process according to claim 6 wherein the copolymerization solvent is propylene dichloride.

8. A process according to claim 7 wherein the alcohol is n-propanol.

References Cited

UNITED STATES PATENTS

| | | | |
|---|---|---|---|
| 2,542,542 | 2/1951 | Lippincott et al. | 252—56 |
| 2,892,793 | 6/1959 | Stewart et al. | 252—56 |
| 3,404,135 | 10/1968 | Tietz | 260—78.5 |
| 3,461,108 | 8/1969 | Heilman et al. | 260—78.5 |

JOSEPH L. SCHOFER, Primary Examiner

S. M. LEVIN, Assistant Examiner

U.S. Cl. X.R.

260—32.8, 33.6, 33.8